United States Patent
Ozawa et al.

(10) Patent No.: US 11,527,929 B2
(45) Date of Patent: Dec. 13, 2022

(54) MOTOR FOR IMPROVING FLUX CONTENT AND ROBOT COMPRISING THE SAME

(71) Applicant: SEIKO EPSON CORPORATION, Tokyo (JP)

(72) Inventors: Kinya Ozawa, Shiojiri (JP); Taishi Okita, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 182 days.

(21) Appl. No.: 17/029,072

(22) Filed: Sep. 23, 2020

(65) Prior Publication Data

US 2021/0091613 A1  Mar. 25, 2021

(30) Foreign Application Priority Data

Sep. 24, 2019 (JP) .............................. JP2019-172654

(51) Int. Cl.
*H02K 1/17* (2006.01)
*H02K 1/14* (2006.01)
*B25J 9/12* (2006.01)

(52) U.S. Cl.
CPC .............. *H02K 1/17* (2013.01); *B25J 9/123* (2013.01); *H02K 1/146* (2013.01); *H02K 2213/03* (2013.01)

(58) Field of Classification Search
CPC ...... H02K 1/17; H02K 1/146; H02K 2213/03; H02K 41/031; H02K 1/06; H02K 41/02; B25J 9/123

See application file for complete search history.

(56) References Cited

U.S. PATENT DOCUMENTS

| | | | | |
|---|---|---|---|---|
| 6,025,658 A | * | 2/2000 | Kamata | G03F 7/70758 310/12.24 |
| 6,870,284 B2 | * | 3/2005 | Uchida | H02K 41/03 310/12.24 |
| 7,965,010 B2 | * | 6/2011 | Froeschle | H02K 41/031 310/156.43 |
| 2016/0241120 A1 | | 8/2016 | Usui | |

FOREIGN PATENT DOCUMENTS

| | | |
|---|---|---|
| JP | 2003209963 A | 7/2003 |
| JP | 2004015906 A | 1/2004 |
| JP | 2007028734 A | 2/2007 |
| JP | 2013106458 A * | 5/2013 |
| JP | 2016152668 A | 8/2016 |
| JP | 2018529302 A | 10/2018 |
| WO | 2018027330 A1 | 2/2018 |

* cited by examiner

Primary Examiner — Bernard Rojas (74) Attorney, Agent, or Firm — Gang Yu (57) ABSTRACT

In a motor including an armature, and a field system having a main pole magnetized in first directions in which a distance from the armature is defined and a sub-pole adjacent to the main pole in second directions orthogonal to the first directions and magnetized in the second directions and forming a Halbach array, a first dimension of the main pole in the second directions, a second dimension of the main pole and the sub-pole in the first directions, and a third dimension as a sum of the dimensions of the main pole and the sub-pole in the second directions are determined according to a flux content generated in a surface of the field system at the armature side.

7 Claims, 6 Drawing Sheets

FIG. 6

MOTOR FOR IMPROVING FLUX CONTENT AND ROBOT COMPRISING THE SAME

The present application is based on, and claims priority from JP Application Serial Number 2019-172654, filed Sep. 24, 2019, the disclosure of which is hereby incorporated by reference herein in its entirety.

BACKGROUND

1. Technical Field

The present disclosure relates to a motor and robot.

2. Related Art

JP-A-2003-209963 discloses a technique of reducing fluctuations of thrust by different width relationships of a main pole with a sub-pole between both end portions and a center portion of the yoke in a linear motor having a Halbach array structure.

However, in the technique described in JP-A-2003-209963, it is hard to expand the range of application of the motor having the Halbach array depending on the requirements of dimensions of a field system and the thrust.

SUMMARY

A first embodiment is directed to a motor including an armature, and a field system having a main pole and a sub-pole adjacent to the main pole and forming a Halbach array, in which the main pole is magnetized in first directions as directions in which the armature and the field system are arranged, the sub-pole is adjacent to the main pole in second directions orthogonal to the first directions and magnetized in the second directions, and a first dimension of the main pole in the second directions, a second dimension of the main pole and the sub-pole in the first directions, and a third dimension as a sum of the dimensions of the main pole and the sub-pole in the second directions are determined according to a flux content generated in a surface of the field system at the armature side.

A second embodiment is directed to the first embodiment, in which $\alpha^- \le \alpha \le \alpha^+$ where the first dimension is w, the second dimension is h, the third dimension is $\tau$, $w/\tau$ is $\alpha$, and $h/\tau$ is $\gamma$.

A third embodiment is directed to the second embodiment, in which $\alpha = k/(\gamma - \gamma_0) + \alpha_0$ may be satisfied.

A fourth embodiment is directed to the second or third embodiment, in which $\alpha \ge \gamma$ may be satisfied.

A fifth embodiment is directed to any one of the second to fourth embodiments, in which the main pole and the sub-pole may be permanent magnets and residual magnetic flux density of the main pole and the sub-pole is equal.

A sixth embodiment is directed to any one of the first to fifth embodiments, in which the armature may be provided as a needle and the field system may be provided as a stator.

A seventh embodiment is directed to any one of the first to sixth embodiments, in which a back yoke placed at an opposite side to the armature of the field system may be provided.

An eighth embodiment is directed to a robot including the motor according to any one of the first to seventh embodiments.

DESCRIPTION OF EXEMPLARY EMBODIMENTS

Figure 1:
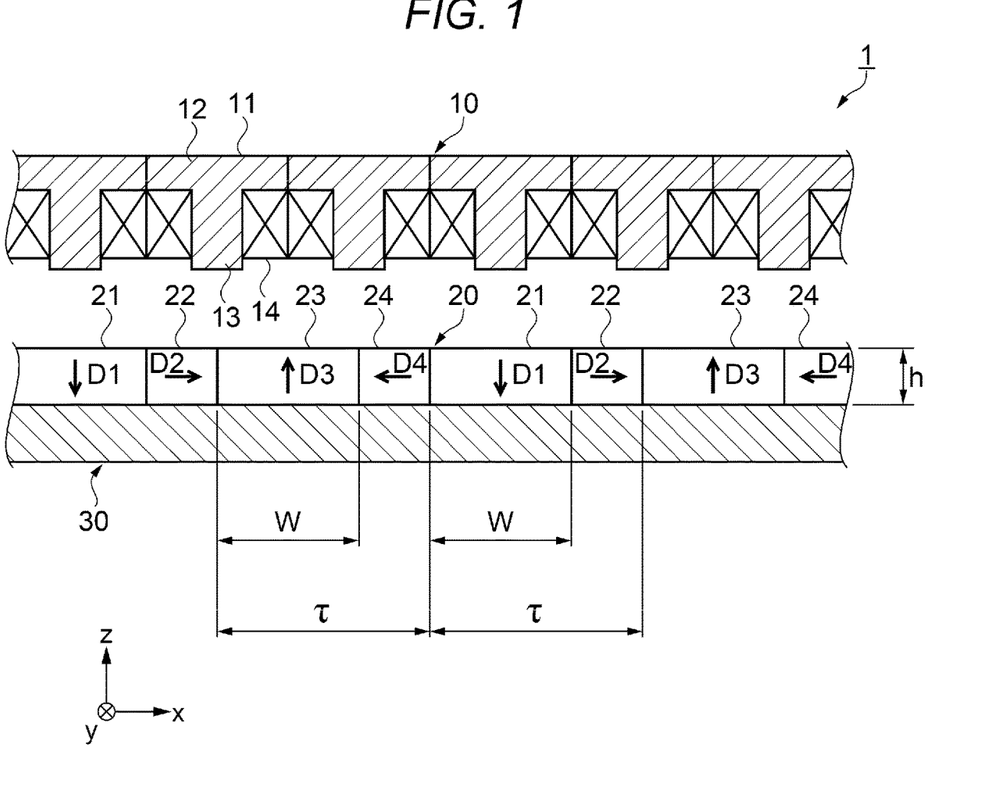
FIG. 1 is a sectional view for explanation of a motor according to an embodiment.

As shown in FIG. 1, a motor 1 according to an embodiment includes an armature 10 and a field system 20 facing the armature 10. The motor 1 is e.g. a linear motor including the armature 10 as a needle and the field system 20 as a stator. The motor 1 may include a back yoke 30 placed at the opposite side of the field system 20 to the armature 10.

The armature 10 includes a plurality of armature cores 11 and a plurality of coils 14 arranged in one direction, i.e., a direction along the x-axis in FIG. 1. The respective armature cores 11 are formed using e.g. magnetic materials such as cast iron. Each of the armature cores 11 has e.g. a yoke portion 12 in a rectangular parallelepiped shape and a core portion 13 projecting from one surface of the yoke portion 12 at the field system 20 side toward the field system 20. Each of the coils 14 includes a winding wire wound around the core portion 13. The respective pluralities of armature cores 11 and coils 14 are placed adjacent to each other in the same dimension and the same orientation.

The field system 20 forms a Halbach array having main poles (21, 23) magnetized in first directions in which the distance from the armature 10 is defined and sub-poles (22, 24) adjacent to the main poles (21, 23) in second directions orthogonal to the first directions and magnetized in the second directions. The armature 10 is placed at the high-field side of the Halbach array. That is, the back yoke 30 is placed at the low-field side of the Halbach array. Note that, in the present disclosure, "magnetic poles" refer to a pair of magnetic poles.

The respective main poles (21, 23) and sub-poles (22, 24) are permanent magnets. The main poles (21, 23) include a first magnetic pole 21 and a third magnetic pole 23. The first directions are directions along the z-axis in FIG. 1, in which the armature and the field system 20 are arranged. The sub-poles (22, 24) include a second magnetic pole 22 and a fourth magnetic pole 24. The second directions are directions along the x-axis in FIG. 1. The second directions are directions along the thrust of the motor 1 and the array directions of the Halbach array. The main poles (21, 23) and the sub-poles (22, 24) are e.g. rectangular parallelepipeds along the first directions and the second directions.

The first magnetic pole 21 is magnetized in a first magnetization direction D1 away from the armature 10. The second magnetic pole 22 is magnetized in a second magnetization direction D2 orthogonal to the first magnetization direction D1 and adjacent to the first magnetic pole 21 in the second magnetization direction D2. The third magnetic pole 23 is magnetized in a third magnetization direction D3 opposite to the first magnetization direction D1 and adjacent to the second magnetic pole 22 in the second magnetization direction D2. The fourth magnetic pole 24 is magnetized in a fourth magnetization direction D4 opposite to the second magnetization direction D2 and adjacent to the third magnetic pole 23 in the second magnetization direction D2. The field system 20 forms the Halbach array in which the respective pluralities of first magnetic poles 21, second magnetic poles 22, third magnetic poles 23, and fourth magnetic poles 24 are cyclically placed in the second magnetization direction D2. That is, the first magnetic pole 21 is adjacent to the fourth magnetic pole 24 in the second magnetization direction D2. Note that, in the example shown in FIG. 1, the first magnetization direction D1 is the −z direction, the second magnetization direction D2 is the +x direction, the third magnetization direction D3 is the +z direction, and the fourth magnetization direction D4 is the −x direction.

The dimension of the main poles (21, 23) in the second directions is a first dimension w. That is, the respective dimensions of the first magnetic pole 21 and the third magnetic pole 23 in the second directions are equal to each other. The dimension of the main poles (21, 23) and the sub-poles (22, 24) in the first directions are a second dimension h. That is, the respective dimensions of the first magnetic pole 21, the second magnetic pole 22, the third magnetic pole 23, and the fourth magnetic pole 24 in the first directions are equal to one another. The sum of the dimensions of the pairs of main poles (21, 23) and sub-poles (22, 24) in the second directions is a third dimension τ. That is, the sum of the dimensions of the first magnetic pole 21 and the second magnetic pole 22 in the second directions is equal to the sum of the dimensions of the third magnetic pole 23 and the fourth magnetic pole 24 in the second directions. The third dimension τ is a half of the array period in the Halbach array. The first dimension w, the second dimension h, and the third dimension τ are determined according to a flux content generated in the surface of the field system 20 at the armature 10 side.

When $\alpha=w/\tau$ and $\gamma=h/\tau$ are defined, the flux content Φ generated per half period in the surface of the field system 20 at the armature 10 side is calculated by the following expression (1).

$$\Phi = 4\sqrt{5}B_r\tau \sum_{n=1,3,5,\cdots} \frac{1-e^{-n\pi\gamma}}{(n\pi)^2}\sin(\theta_p + \tan^{-1}(1/2)) \quad (1)$$

where $B_r$ is residual flux density of the main poles (21, 23) and the sub-poles (22, 24) and $\theta_p=n\pi(1-\alpha)/2$. The flux content Φ corresponds to the total number of lines of magnetic force extending from the surface of the field system 20 at the armature 10 side and corresponds to a quantity obtained by surface integral of the magnetic flux density in the surface of the field system 20 at the armature 10 side. Note that the thicknesses of the adhesive for bonding the main poles (21, 23) and the sub-poles (22, 24) are neglected.

Figure 2:
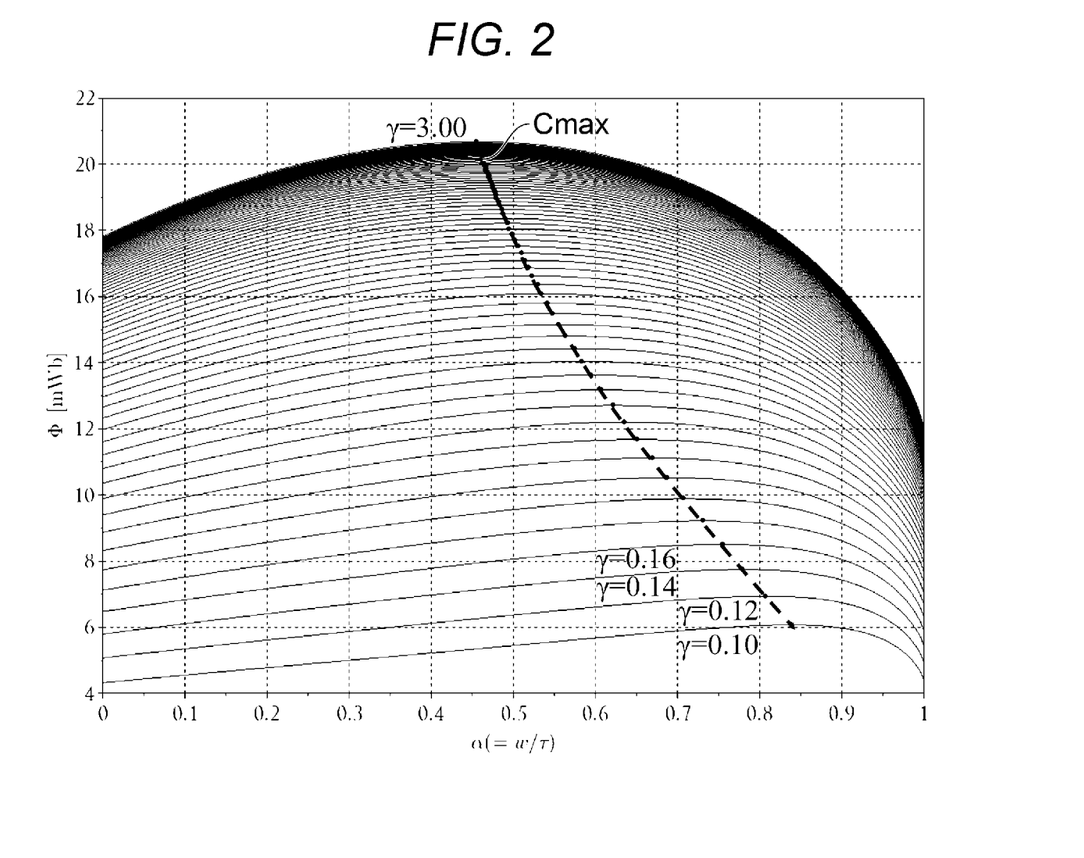
FIG. 2 is a graph for explanation of a relationship between a flux content and a dimension ratio of a field system.

As shown in FIG. 2, the characteristics of the flux content Φ relative to α calculated based on the expression (1) respectively have the maximum values at the respective values at intervals of 0.02 in a range γ=0.10 to 3.00, for example. Note that τ=0.02 [m] and $B_r$=1.2 [T] are employed. Further, the respective magnetic poles have linear magnetization characteristics, but do not have magnetic anisotropy. A curve Cmax in FIG. 2 is an approximate curve of lines connecting the respective maximum values. That is, in the characteristics at the respective γ, when α is located near the curve Cmax, the flux content Φ is generally the maximum. In the relationship between the first dimension w and the second dimension h with respect to the third dimension τ, the maximum flux content Φ refers to the maximum thrust of the motor 1.

Figure 3:
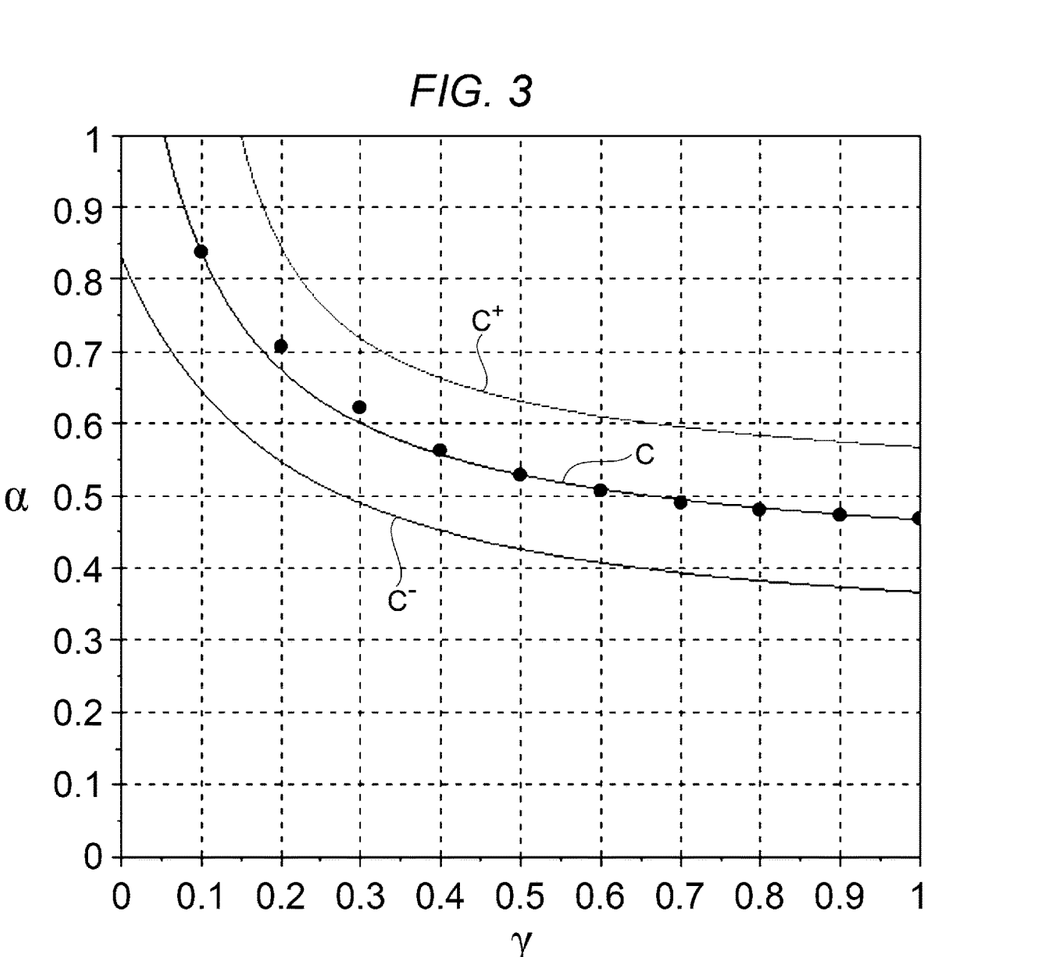
FIG. 3 is a graph for explanation of a relationship of the dimension ratio when the flux content is the maximum.

As shown in FIG. 3, for example, in a range γ=0.1 to 1, the relationship between α and γ when the flux content Φ is the maximum is expressed by a curve C. That is, the curve C is an approximate curve of the lines connecting the respective maximum values of the flux content Φ in the γ–α characteristics corresponding to the curve Cmax in FIG. 2. The curve C is expressed by the following expression (2). Here, k=0.07, $\gamma_0$=−0.07, $\alpha_0$=0.40.

$$\alpha=k/(\gamma-\Gamma_0)+\alpha_0 \quad (2)$$

It is understood that, to obtain the flux content Φ generally equal to or more than 80% of the maximum value from the entire characteristics in FIG. 2, it is necessary that α falls within a range of ±0.1 from the value at which the flux content Φ is the maximum. From that, a curve $C^+$ and a curve $C^-$ are defined as a range that can be taken by α and γ when the flux content Φ is generally the maximum. The curve $C^+$ and the curve $C^-$ are two curves defined at fixed distances from the curve C, i.e., at distances along the normal of the curve C as Δ. The curve $C^+$ and the curve $C^-$ are expressed by the following expression (3). Here, double sign corresponds, Δ=0.1.

$$\alpha^{\pm} = \frac{k\sqrt{k^2+(\gamma-\gamma_0)^4}}{(\gamma-\gamma_0)\sqrt{k^2+(\gamma-\gamma_0)^4} \mp k\Delta} + \alpha_0 \pm \frac{\Delta(\gamma-\gamma_0)^2}{\sqrt{k^2+(\gamma-\gamma_0)^4}} \quad (3)$$

As described above, when α and γ are within the range defined by the curve $C^+$ and the curve $C^-$, the flux content Φ is generally the maximum. That is, the first dimension w, the second dimension h, and the third dimension τ are determined to satisfy $\alpha^-\leq\alpha\leq\alpha^+$, and thereby, the flux content Φ may be improved in the relationship between α and γ. Further, the first dimension w, the second dimension h, and the third dimension τ are determined to satisfy the expression (2), and thereby, the flux content Φ may be optimized in the relationship between α and γ. Furthermore, $\alpha^-\leq\alpha\leq\alpha^+$ or the condition of the expression (2) and a condition of α≥γ are satisfied, and thereby, the flux content Φ may be improved and the weight of the field system 20 may be reduced.

Figure 4:
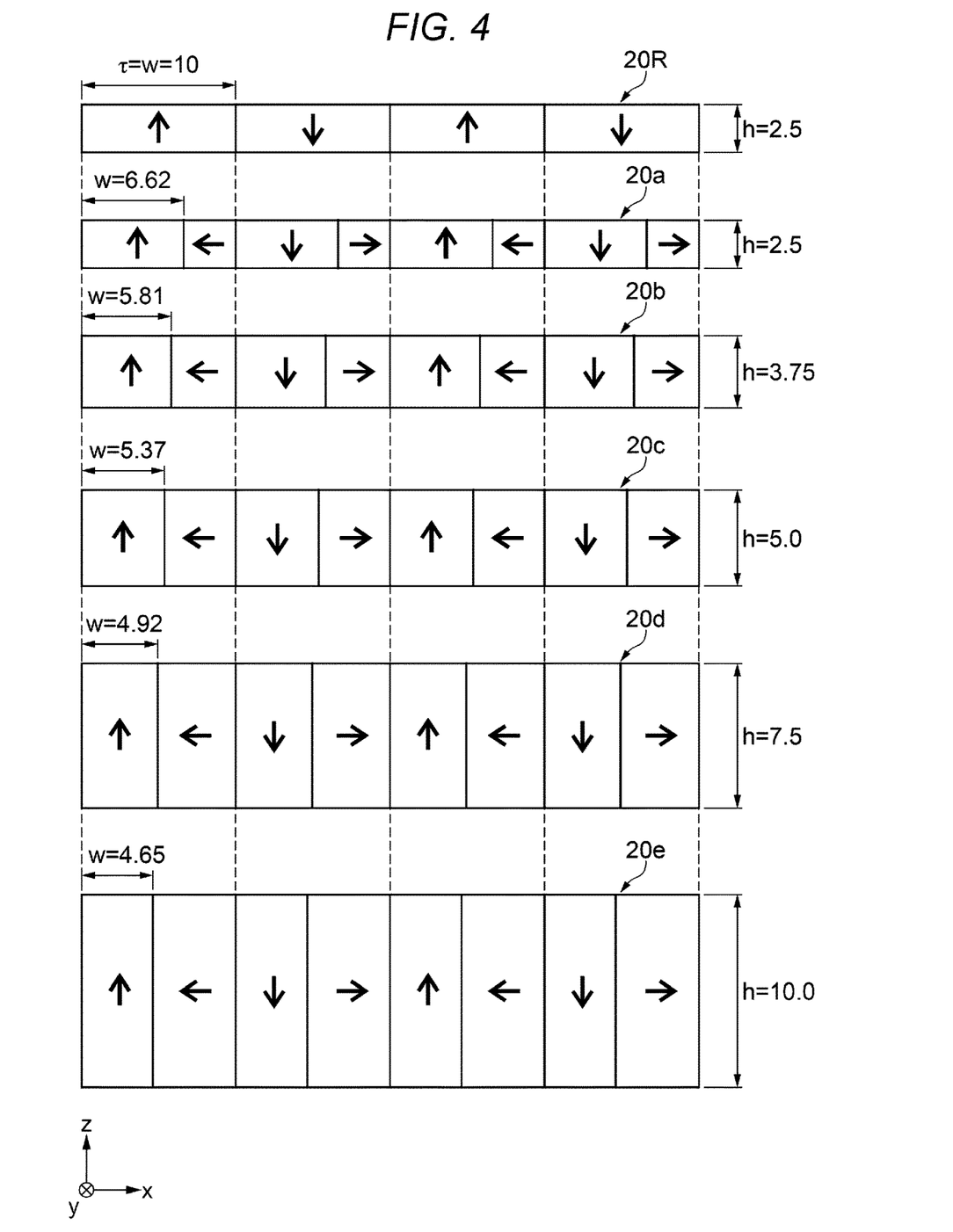
FIG. 4 is a diagram for explanation of examples of dimension ratios of the field system.

As shown in FIG. 4, a typical field system 20R is formed by two and the −z direction. The two types of magnetic poles correspond to the first magnetic pole 21 and the third magnetic pole 23. In this case, the dimensions of the magnetic poles of the field system 20R in the array directions correspond to the first dimension w and the third dimension τ, respectively. FIG. 4 shows field systems 20a to 20e respectively having the optimal first dimensions w and the second dimensions h calculated based on the expression (2) when the third dimension τ is "10" as examples of the field system 20.

In the field system 20a, the first dimension w is 6.62 and the second dimension h is 2.5. In the field system 20b, the first dimension w is 5.81 and the second dimension h is 3.75. In the field system 20c, the first dimension w is 5.37 and the second dimension h is 5.0. In the field system 20d, the first dimension w is 4.92 and the second dimension h is 7.5. In the field system 20e, the first dimension w is 4.65 and the second dimension h is 10.0.

As described above, according to the motor 1 of the embodiment, the first dimension w, the second dimension h, and the third dimension τ in the Halbach array are determined according to the flux content Φ. That is, the lengths and the thicknesses of the respective magnetic poles with reference to the array period of the Halbach array correlate according to the flux content 1. Thereby, the range that can address the requirements of the dimensions of the field system 20 and the thrust of the motor 1 may be expanded and the application range of the motor 1 may be expanded. Further, the second dimension h as the thickness of the field system 20 is fixed and it is not necessary for the field system 20 to have a complex structure.

Figure 5:
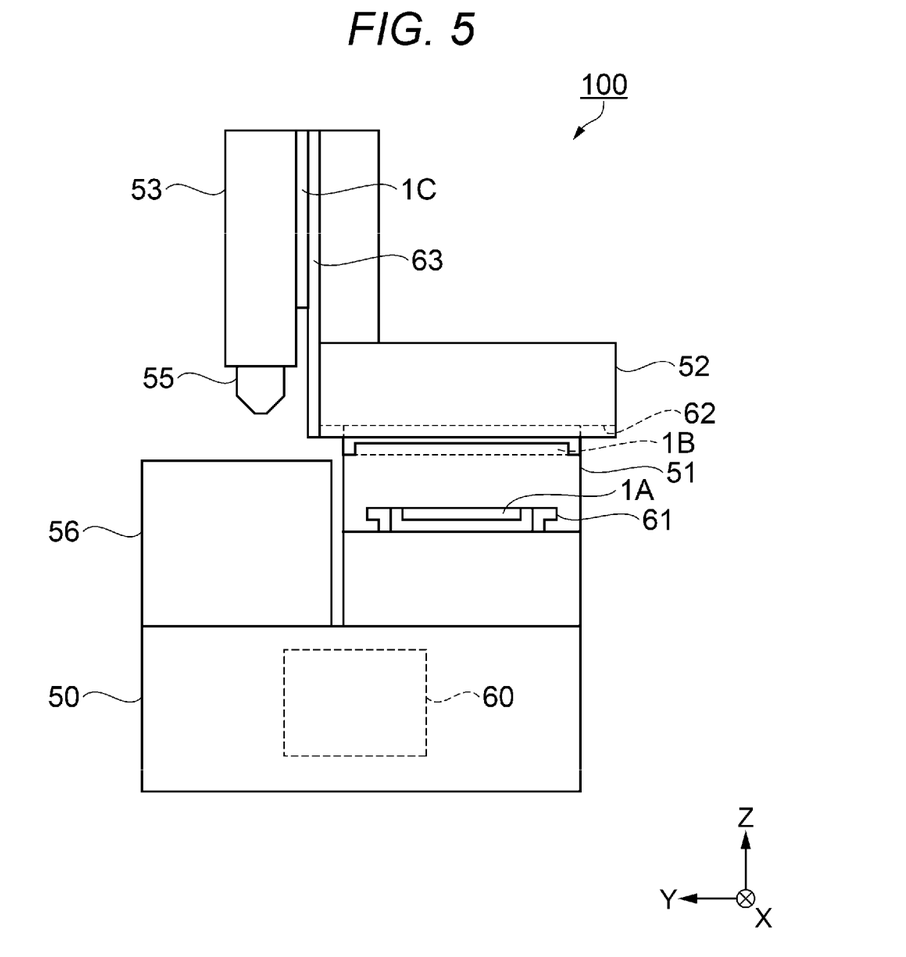
FIG. 5 is a side view for explanation of a robot including the motor according to the embodiment.

As below, referring to FIG. 5, a robot 100 including a first motor 1A, a second motor 1B, and a third motor 1C respectively having the equal configuration to that of the motor 1 according to the embodiment will be explained. The robot 100 includes a base 50, a first link 51, a second link 52, a third link 53, an end effector 55, a workbench 56, a control apparatus 60, a first prismatic joint 61, a second prismatic joint 62, and a third prismatic joint 63.

The first prismatic joint 61 drives the first link 51 in directions along the X-axis relative to the base 50 by the thrust of the first motor 1A. The second prismatic joint 62 drives the second link 52 in directions along the Y-axis relative to the first link 51 by the thrust of the second motor 1B. The third prismatic joint 63 drives the third link 53 in directions along the Z-axis relative to the second link 52 by the thrust of the third motor 1C. The orthogonal coordinate system having the X, Y, Z axes is set for the base 50. That is, the robot 100 is a Cartesian coordinate robot having degrees of freedom with respect to the three axes orthogonal to one another.

For example, the end effector 55 performs predetermined work on an object placed on the workbench 56. As the end effector 55, various tools including e.g. a gripper, screw driver, welding gun, and spray gun can be employed. The control apparatus 60 includes a control circuit forming a computer system, and a drive circuit that drives the first motor 1A, the second motor 1B, and the third motor 1C according to the control by the control circuit. The position of the end effector 55 relative to the base 50 and the workbench 56 is determined according to the control by the control apparatus 60, and thereby, the end effector performs work on the object.

The robot 100 includes the first motor 1A, the second motor 1B, and the third motor 1C equal to the motor 1 according to the embodiment, and thereby, the range that can address the requirements of the dimensions and the thrust is expanded. According to the motor 1, the application range is expanded.

The embodiment is explained as above, however, the present disclosure is not limited to these disclosures. The configurations of the respective parts may be replaced by arbitrary configurations having the same functions, and arbitrary configurations in respective embodiments may be omitted or added within the technical scope of the present disclosure. Various alternative embodiments will be clear for a person skilled in the art from these disclosures.

Figure 6:
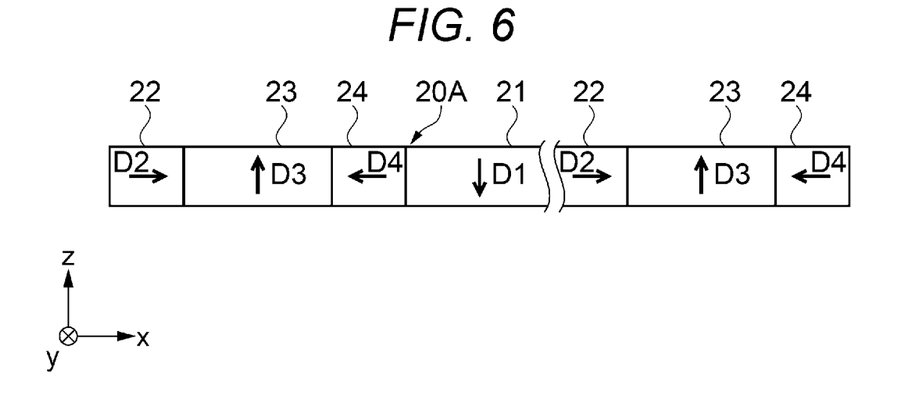
FIG. 6 is a diagram for explanation of a field system of a motor according to a modified example of the embodiment.

For example, in the above described embodiment, the magnetic pole placed at the end of the field system 20 is not necessarily the first magnetic pole 21. As shown in FIG. 6, a field system 20A in another embodiment includes the second magnetic pole 22 and the fourth magnetic pole 24 placed at ends. That is, the pair of sub-poles (22, 24) located at the ends in the array directions of the Halbach array are magnetized in directions facing each other. Thereby, the ratio of the flux content Φ relative to the entire length in the second directions of the field system 20 may be increased.

Further, in the above described embodiment, the field system 20 may function as a needle and the armature 10 may function as a stator. The motor 1 may include respective pluralities of the field systems 20 and the armatures 10. Obviously, the motor 1 may function as a power generator that can improve generated electric power. Even when the array directions of the Halbach array are circumferential directions, that expressions (1) to (3) can be applied depending on the dimensions of the respective magnetic poles. The same applies to a case where the array directions of the Halbach array are axial directions and the respective magnetic poles form a cylindrical shape as a whole. Therefore, the magnetic characteristics of the main poles (21, 23) and the sub-poles (22, 24) may be different from each other. For example, the sub-poles (22, 24) may have higher coercivity than the main poles (21, 23) or the main poles (21, 23) may have higher residual magnetic flux density than the sub-poles (22, 24). Thereby, demagnetization of the permanent magnets is suppressed.

In addition, obviously, the present disclosure includes various embodiments not described above e.g. configurations that apply the above described respective configurations to one another. The technical scope of the present disclosure is determined only by the matters used to specify the present disclosure according to proper claims from the above description.

As below, the matters derived from the above described embodiments will be described as respective embodiments.

A first embodiment is a motor including an armature, and a field system having a main pole and a sub-pole adjacent to the main pole and forming a Halbach array, wherein the main pole is magnetized in first directions as directions in which the armature and the field system are arranged, the sub-pole is adjacent to the main pole in second directions orthogonal to the first directions and magnetized in the second directions, and a first dimension of the main pole in the second directions, a second dimension of the main pole and the sub-pole in the first directions, and a third dimension as a sum of the dimensions of the main pole and the sub-pole in the second directions are determined according to a flux content generated in a surface of the field system at the armature side. According to the first embodiment, the range that can address the requirements of the dimensions of the field system and the thrust of the motor may be expanded and the application range of the motor may be expanded.

A second embodiment satisfies $\alpha^- \le \alpha \le \alpha^+$ where the first dimension is w, the second dimension is h, the third dimension is τ, w/τ is α, and h/τ is γ in the first embodiment. According to the second embodiment, the respective dimensions of the field system are determined to satisfy the condition defined by the expression (3), and thereby, the flux content of the field system may be improved.

A third embodiment satisfies $\alpha = k/(\gamma - \gamma_0) + \alpha_0$ in the second embodiment. According to the third embodiment, the flux content of the field system may be optimized.

A fourth embodiment is that $\alpha \ge \gamma$ in the second or third embodiment. According to the fourth embodiment, the flux content of the field system may be improved and the weight of the field system is reduced.

A fifth embodiment is that the main pole and the sub-pole are permanent magnets and residual magnetic flux density of the main pole and the sub-pole is equal in any one of the second to fourth embodiments. According to the fifth embodiment, the residual magnetic flux density of the respective magnetic poles coincides with the condition used for the derivation of the expression (3), and thereby, the flux content of the field system may be further improved.

A sixth embodiment is that the armature is provided as a needle and the field system is provided as a stator in any one of the first to fifth embodiments. According to the sixth embodiment, the motor including the Halbach array as a stator may be realized.

A seventh embodiment is that a back yoke placed at an opposite side to the armature of the field system is provided in any one of the first to sixth embodiments. According to the seventh embodiment, the back yoke is placed at the low-field side of the Halbach array, and thereby, the thickness of the back yoke may be reduced.

An eighth embodiment is a robot including the motor according to any one of the first to seventh embodiments. According to the eighth embodiment, the robot may be realized by the motor having the wider range that can address the requirements of the dimensions of the field system and the thrust of the motor.

What is claimed is:

1. A motor comprising:
an armature; and
a field system having a main pole and a sub-pole adjacent to the main pole and forming a Halbach array, wherein
the main pole is magnetized in first directions as directions in which the armature and the field system are arranged,
the sub-pole is adjacent to the main pole in second directions orthogonal to the first directions and magnetized in the second directions, and
a first dimension of the main pole in the second directions, a second dimension of the main pole and the sub-pole in the first directions, and a third dimension as a sum of the dimensions of the main pole and the sub-pole in the second directions are determined according to a flux content generated in a surface of the field system at the armature side,
wherein $\alpha^- \leq \alpha \leq \alpha^+$, and $$\alpha^{\pm} = \frac{k\sqrt{k^2 + (\gamma - \gamma_0)^4}}{(\gamma - \gamma_0)\sqrt{k^2 + (\gamma - \gamma_0)^4} \mp k\Delta} + \alpha_0 \pm \frac{\Delta(\gamma - \gamma_0)^2}{\sqrt{k^2 + (\gamma - \gamma_0)^4}}$$

(double sign corresponds), k=0.07, $\gamma_0$=−0.07, $\alpha_0$=0.40, $\Delta$=0.1, where the first dimension is w, the second dimension is h, the third dimension is $\tau$, w/$\tau$ is $\alpha$, and h/$\tau$ is $\gamma$.

2. The motor according to claim 1, wherein $\alpha$=k/($\gamma$−$\gamma_0$)+$\alpha_0$.

3. The motor according to claim 1, wherein $\alpha \geq \gamma$.

4. The motor according to claim 1, wherein
the main pole and the sub-pole are permanent magnets and residual magnetic flux density of the main pole and the sub-pole is equal.

5. The motor according to claim 1, wherein
the armature is provided as a moveable element and the field system is provided as a stator.

6. The motor according to claim 1, wherein
a back yoke placed at an opposite side to the armature of the field system is provided.

7. A robot comprising:
a motor, comprising:
an armature; and
a field system having a main pole and a sub-pole adjacent to the main pole and forming a Halbach array, wherein
the main pole is magnetized in first directions as directions in which the armature and the field system are arranged,
the sub-pole is adjacent to the main pole in second directions orthogonal to the first directions and magnetized in the second directions, and
a first dimension of the main pole in the second directions, a second dimension of the main pole and the sub-pole in the first directions, and a third dimension as a sum of the dimensions of the main pole and the sub-pole in the second directions are determined according to a flux content generated in a surface of the field system at the armature side,
wherein $\alpha^- \leq \alpha \leq \alpha^+$, and $$\alpha^{\pm} = \frac{k\sqrt{k^2 + (\gamma - \gamma_0)^4}}{(\gamma - \gamma_0)\sqrt{k^2 + (\gamma - \gamma_0)^4} \mp k\Delta} + \alpha_0 \pm \frac{\Delta(\gamma - \gamma_0)^2}{\sqrt{k^2 + (\gamma - \gamma_0)^4}}$$

(double sign corresponds), k=0.07, $\gamma_0$=−0.07, $\alpha_0$=0.40, $\Delta$=0.1, where the first dimension is w, the second dimension is h, the third dimension is $\tau$, w/$\tau$ is $\alpha$, and h/$\tau$ is $\gamma$.

* * * * *